United States Patent
Shah

(10) Patent No.: US 11,844,006 B2
(45) Date of Patent: Dec. 12, 2023

(54) IN-VEHICLE MULTI-USER WIRELESS COMMUNICATION CONNECTIVITY

(71) Applicant: T-Mobile Innovations LLC, Overland Park, KS (US)

(72) Inventor: Mehul Jayant Shah, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/592,524

(22) Filed: Feb. 4, 2022

(65) Prior Publication Data
US 2023/0254675 A1 Aug. 10, 2023

(51) Int. Cl.
*H04W 4/48* (2018.01)
*H04W 8/18* (2009.01)

(52) U.S. Cl.
CPC ............. *H04W 4/48* (2018.02); *H04W 8/183* (2013.01)

(58) Field of Classification Search
None
See application file for complete search history.

(56) References Cited

U.S. PATENT DOCUMENTS

| | | | |
|---|---|---|---|
| 2012/0203557 A1* | 8/2012 | Odinak | G01C 21/3608 704/270.1 |
| 2015/0243165 A1* | 8/2015 | Elsheemy | G08G 1/096775 340/906 |
| 2021/0377808 A1* | 12/2021 | Indurkar | H04W 12/63 |

* cited by examiner

Primary Examiner — Frantz Bataille

(57) ABSTRACT

A method of twinning a primary wireless communication device with an in-vehicle wireless communication device. The method comprises inputting a plurality of phone numbers into the in-vehicle wireless communication device that comprises an eSIM storing an eSIM profile provisioned for wireless communication service in a wireless communication network, wherein each phone number is associated with a primary wireless communication device of a different user; sending a first bundle of twinning credentials by the in-vehicle wireless communication device to the wireless communication network, wherein the first bundle of twinning credentials comprises a VIN, an ICCID identifying the eSIM, an EID identifying the eSIM profile, and a first phone number of the plurality of phone numbers input into the in-vehicle communication device associated with a primary wireless communication device of a first user; and providing wireless communication service by the in-vehicle communication device based on the first phone number.

20 Claims, 10 Drawing Sheets

IN-VEHICLE MULTI-USER WIRELESS COMMUNICATION CONNECTIVITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may receive a wireless communication link from a cell site or cell tower that has a wired or wireless communication link to a network. Initializing this wireless communication link entails the wireless communication device providing authentication credentials to the cell site. These authentication credentials may be stored in a subscriber identity module (SIM) card that is installed in the wireless communication device. Alternatively, and more commonly, the authentication credentials may be derived from private keys or tokens retained by the SIM, wherein the private keys cannot be determined from the transmitted authentication credentials (e.g., the authentication credentials are generated using a secure one-way hash function or other transformation). If the cell site determines that the authentication credentials are valid, the cell site provides the wireless communication link to the wireless communication device. The traditional SIM card implementation is currently evolving towards an embedded SIM (eSIM) that is a non-removable chip connected to the mother board of the wireless communication device. In some contexts, an eSIM may be referred to as an embedded universal integrated circuit card (eUICC). The eSIM and/or eUICC may in time be integrated into a system on a chip (SoC) with other components of a wireless communication device. In addition to authentication credentials, the SIM card, eSIM, or eUICC may store other wireless communication service provider data and wireless communication service subscriber data, for example data network access keys and credentials, encryption keys, preferred roaming lists, branding content, and executable applications. In the case of eSIMs and eUICCs, the data and instructions stored in the eSIM and/or eUICC may be referred to as an eSIM profile. In some instances, an eSIM or eUICC can be given a different identity by deactivating a first eSIM profile and installing and activating a second different eSIM profile.

SUMMARY

In an embodiment, a method of twinning a primary wireless communication device with an in-vehicle wireless communication device is disclosed. The method comprises inputting a plurality of phone numbers into the in-vehicle wireless communication device that comprises an embedded subscriber identity module (eSIM) storing an eSIM profile provisioned for wireless communication service in a wireless communication network, wherein each phone number is associated with a primary wireless communication device of a different user, sending a first bundle of twinning credentials by the in-vehicle wireless communication device to the wireless communication network, wherein the first bundle of twinning credentials comprises a vehicle identification number (VIN) of a vehicle in which the in-vehicle wireless communication device is installed, an integrated circuit card identity (ICCID) identifying the eSIM profile, an embedded identity document (EID) identifying the eSIM, and a first phone number of the plurality of phone numbers input into the in-vehicle communication device associated with a primary wireless communication device of a first user, whereby the in-vehicle wireless communication device is twinned with the first phone number, and providing wireless communication service by the in-vehicle communication device based on the first phone number. The method further comprises sending a second bundle of twinning credentials by the in-vehicle wireless communication device to the wireless communication network, wherein the second bundle of twinning credentials comprises the VIN, the ICCID, the EID, and a second phone number of the plurality of phone numbers input into the in-vehicle communication device associated with a primary wireless communication device of a second user, whereby the in-vehicle wireless communication device is untwinned from the first phone number and twinned with the second phone number and providing wireless communication service by the in-vehicle communication device based on the second phone number.

In another embodiment, a method of twinning a primary wireless communication device with an in-vehicle wireless communication device of a rental car is disclosed. The method comprises inputting a first phone number into the in-vehicle wireless communication device that comprises an embedded subscriber identity module (eSIM) storing an eSIM profile provisioned for wireless communication service in a wireless communication network, wherein the first phone number is associated with a primary wireless communication device of a first user of the rental car, sending a first bundle of twinning credentials by the in-vehicle wireless communication device to the wireless communication network, wherein the first bundle of twinning credentials comprises a vehicle identification number (VIN) of the rental car in which the in-vehicle wireless communication device is installed, an integrated circuit card identity (ICCID) identifying the eSIM profile, an embedded identity document (EID) identifying the eSIM, and a first phone number of the plurality of phone numbers input into the in-vehicle communication device associated with a primary wireless communication device of a first user, whereby the in-vehicle wireless communication device is twinned with the first phone number, and providing wireless communication service by the in-vehicle wireless communication device based on the first phone number. The method further comprises receiving a check-in message by the in-vehicle communication device from a rental car agency computer and in response to receiving the check-in message, sending a twinning cancellation message by the in-vehicle wireless communication device to the wireless communication network, whereby the in-vehicle wireless communication device is untwinned from the first phone number. The method further comprises inputting a second phone number into the in-vehicle wireless communication device, wherein the second phone number is associated with a primary wireless communication device of a second user of the rental car, sending a second bundle of twinning credentials by the in-vehicle wireless communication device to the wireless communication network, wherein the second bundle of twinning credentials comprises the VIN, the ICCID, the EID, and the second phone number, whereby the in-vehicle wireless communication device is twinned with the second phone number, and providing wireless communication service by the in-vehicle wireless communication device based on the second phone number.

In yet another embodiment, a method of twinning a primary wireless communication device with an in-vehicle wireless communication device is disclosed. The method comprises inputting a first phone number into the in-vehicle wireless communication device that comprises an embedded subscriber identity module (eSIM) storing an eSIM profile provisioned for wireless communication service in a plurality of different wireless communication networks, wherein the first phone number is associated with a primary wireless communication device of a first user that is subscribed to receive wireless communication in a first wireless communication network of the plurality of different wireless communication networks and identifying the first wireless communication network by the in-vehicle wireless communication device based on analyzing the first phone number. The method further comprises sending a first bundle of twinning credentials by the in-vehicle wireless communication device to the first wireless communication network, wherein the first bundle of twinning credentials comprises a vehicle identification number (VIN) of a vehicle in which the in-vehicle wireless communication device is installed, an integrated circuit card identity (ICCID) identifying the eSIM profile, an embedded identity document (EID) identifying the eSIM, and the first phone number, whereby the in-vehicle wireless communication device is twinned with the first phone number, and providing wireless communication service by the in-vehicle communication device via the first wireless communication network based on the first phone number. The method further comprises inputting a second phone number into the in-vehicle wireless communication device, wherein the second phone number is associated with a primary wireless communication device of a second user that is subscribed to receive wireless communication in a second wireless communication network of the plurality of different wireless communication networks and identifying the second wireless communication network by the in-vehicle wireless communication device based on analyzing the second phone number. The method further comprises, in response to receiving the second phone number, sending a twinning cancellation message by the in-vehicle communication device to the first wireless communication network, whereby the in-vehicle wireless communication device is untwinned from the first phone number, sending a second bundle of twinning credentials by the in-vehicle wireless communication device to the second wireless communication network, wherein the second bundle of twinning credentials comprises the VIN, the ICCID, the EID, and the second phone number, whereby the in-vehicle wireless communication device is twinned with the second phone number, and providing wireless communication service by the in-vehicle communication device via the second wireless communication network based on the second phone number.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
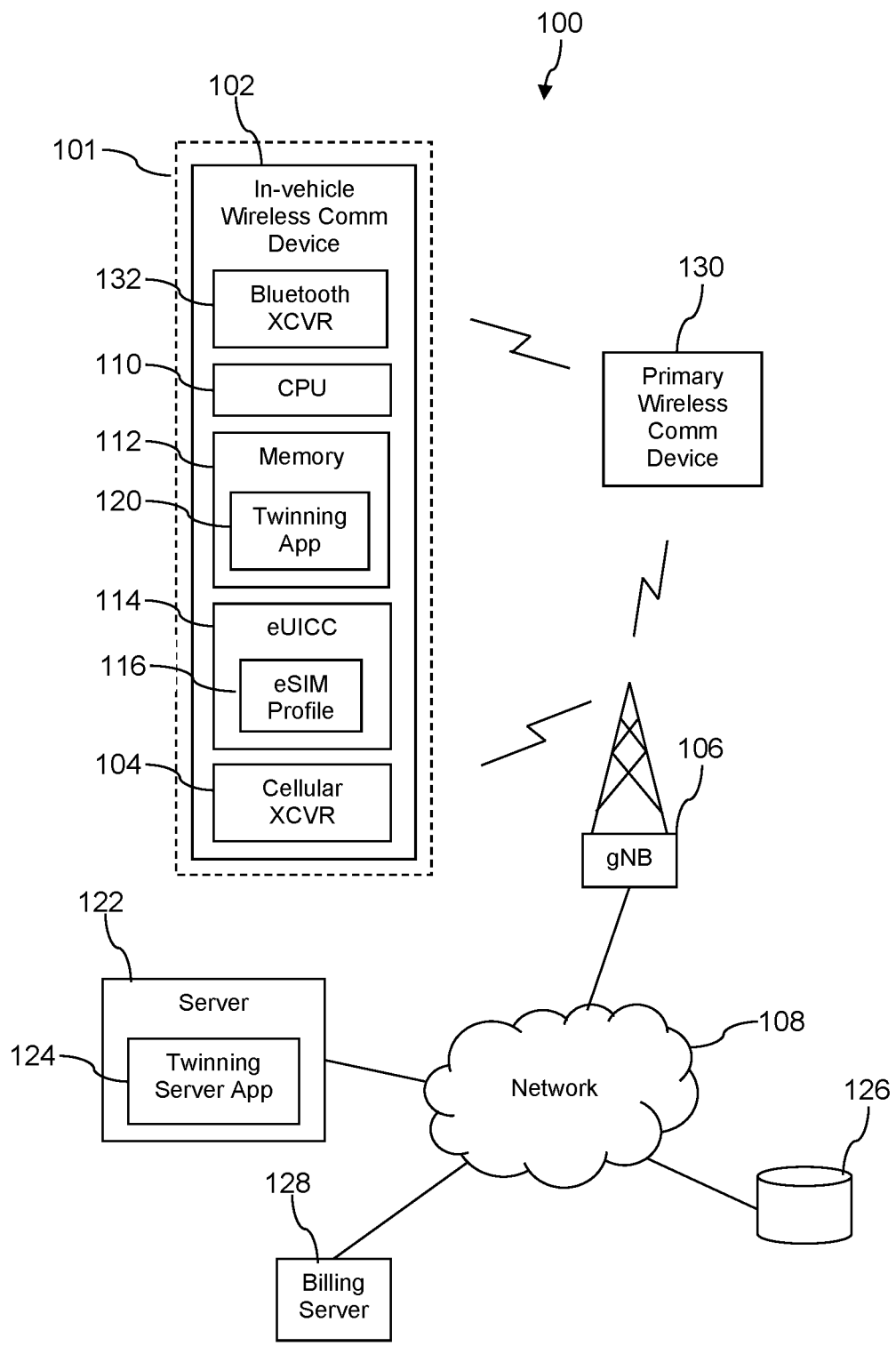
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some vehicles support Bluetooth pairing a wireless communication device such as a mobile phone to an in-vehicle computer such as a telematics unit or a head unit. In this situation, the user may be able to use voice commands to the in-vehicle computer to operate the wireless communication device, present audio over a sound system of the vehicle, and send audio from a microphone (e.g., the voice of the driver is captured by the microphone) to the wireless communication device via Bluetooth wireless communication. But Bluetooth pairing can be unreliable.

The present disclosure teaches twinning primary wireless communication devices, for example mobile phones, with an in-vehicle wireless communication device such that wireless cellular calls placed to the phone number of the primary wireless communication device rings both the primary wireless communication device and the twinned in-vehicle wireless communication device. Bluetooth pairing does NOT operate in this way: the primary wireless communication device is linked to the cellular radio access network (RAN) and provides an indirect link to a paired Bluetooth device via a Bluetooth wireless link. The Bluetooth device is not paged or rung by the RAN when an incoming call occurs. More particularly, the disclosure teaches a system for ease of twinning the in-vehicle mobile communication device to different primary wireless communication devices over time based on using a single embedded subscriber identity module (eSIM) profile installed in an embedded universal integrated circuit card (eUICC) in the in-vehicle wireless communication device. Said in other words, a single eSIM profile may be permanently (or for an extended period of time) activated in the eUICC of the vehicle while an association of the eSIM profile is adapted in the backend of the network infrastructure to link to different users at different times. This can involve changing the subscription account that is associated with the single eSIM profile for billing purposes. This can involve changing the subscription account that is associated with the single eSIM profile for call placement and data service purposes. In an embodiment, the user would log into an API provided by the wireless communication service provider to change the association.

This process may be guarded by a secure process. For example, the user may be challenged to provide a personal identification number (PIN) that is confidential. For example, the user may be challenged to complete a two-factor authentication process, wherein a secure code is sent to the primary wireless communication device of the user, and the user is prompted to provide this secure code into the interface being used to change the association.

Relying on a single eSIM profile installed in the in-vehicle wireless communication device avoids the inconvenience of swapping out physical SIM cards as would be necessary under conventional twinning procedures. Relying on a single eSIM profile installed in the in-vehicle wireless communication device also avoids having to provision a plurality of different eSIM profiles into the eUICC, which otherwise unnecessarily wastes eSIM profile resources. Additionally, some eUICCs installed in in-vehicle wireless communication systems may have limited memory capacity for storing a plurality of eSIM profiles concurrently. Thus, the present disclosure provides a technical solution to the technical problem of twinning the in-vehicle wireless communication device with different primary wireless communication devices.

The in-vehicle wireless communication device may be part of a telematics unit, a head unit, an in-vehicle computer, or other wireless enabled communication device installed quasi-permanently into a vehicle (e.g., a skilled mechanic may be needed to remove the in-vehicle wireless communication device). The eSIM profile may be configured into the eUICC of the in-vehicle wireless communication device by an original equipment manufacturer (OEM) of the wireless communication device, by a vehicle assembly facility (e.g., a car manufacturing plant), by an employee of a car dealer, or by an owner of the vehicle. In an embodiment, other than conventional updates and patches automatically delivered by a wireless communication service provider that provides wireless communication subscription service to the in-vehicle communication device, the eSIM profile may not be altered once it is installed into the eUICC of the in-vehicle wireless communication device. The eSIM profile may define a variety of wireless communication service provider data and wireless communication service subscriber data. The eSIM profile may define network access keys and credentials, encryption keys, preferred roaming lists (PRLs), executable applications, branding content, and other data.

In an embodiment, a vehicle such as a family car may be shared by different drivers. When a first driver is using the vehicle, he may trigger the in-vehicle wireless communication device to twin to his primary wireless communication device, for example to his smart phone. The wireless communication subscription plan associated with his primary wireless communication device may be of a type to support such twinning service. The wireless communication twinning service provided may be billed onto the wireless communication subscription account of the first driver. The in-vehicle wireless communication device may store or receive as input the phone number of the first driver's primary wireless communication device. The in-vehicle wireless communication can send a first bundle of twinning credentials to a wireless communication network. The twinning credentials may include the first driver's phone number, a vehicle identification number (VIN) of the vehicle in which the in-vehicle wireless communication device is installed, an integrated circuit card identity (ICCID) identifying the eUICC of the in-vehicle wireless communication device, and an embedded identity document (EID) identifying the eSIM profile installed in the eUICC.

When the wireless communication network receives the first bundle of twinning credentials, a server may create an association between the account of the primary wireless communication device of the first driver and the in-vehicle wireless communication device in a data store maintained by the wireless communication network. The wireless communication network may notify a billing server of the association between the primary wireless communication device of the first driver and the in-vehicle wireless communication device so that the billing server can aggregate tolls associated with wireless traffic generated by the in-vehicle wireless communication device to the wireless communication subscription account of the primary wireless communication device of the first driver. For example, the billing server may count call detail records (CDRs) or other usage reports generated by the in-vehicle wireless communication device against the wireless communication service account of the primary wireless communication device. When calls are made to the phone number of the primary wireless communication device of the first driver, because of the twinning, the wireless communication service provider rings both the primary wireless communication device of the first driver and the in-vehicle wireless communication device.

When a second driver is using the vehicle, she may trigger the in-vehicle wireless communication device to pair to her primary wireless communication device. In this case, the in-vehicle wireless communication device first completes an untwining procedure with the wireless communication network whereby the in-vehicle wireless communication device is disassociated from the phone number of the primary wireless communication device of the first driver. Then the in-vehicle wireless communication device twins to the phone number of the primary wireless communication device of the second driver in a process similar to that described above. If there are other drivers who share the vehicle, the in-vehicle wireless communication device can be twinned to the primary wireless communication devices of these other drivers in a like manner. The in-vehicle wireless communication device is twinned not only to a voice communication service of the primary wireless communication device but also to a data communication service of the primary wireless communication device.

In an embodiment, users may input their phone number into the in-vehicle wireless communication device or a web page a single time and the system or in-vehicle wireless communication device can retain these phone numbers. Later, the user may simply select to twin to his or her phone number as presented on a display linked to the in-vehicle wireless communication device or on a web page. Alternatively, a Bluetooth radio transceiver of the in-vehicle wireless communication device may receive a radio transmission of a Bluetooth radio transceiver in a primary wireless communication device, identify this Bluetooth transmission with the appropriate phone number previously registered or input, and automatically twin to this phone number. Alternatively, the users may associate their phone numbers to vehicle key fobs each user possesses, for example using a user interface provided by the in-vehicle wireless communication device on a display in the dash of the vehicle or via a web page. When the in-vehicle wireless communication device detects a key fob that has been registered to a phone number, the in-vehicle wireless communication device may automatically initiate twinning to the associated phone number. It is noted that the twinning described herein does not interfere with other Bluetooth pairing functionality, such as playing audio content stored on a primary communication device over an in-vehicle sound system via a Bluetooth wireless link.

In an embodiment, a rental car may have an in-vehicle wireless communication device, and this in-vehicle wireless communication device may be paired serially with primary wireless communication devices of different car rental drivers. The in-vehicle wireless communication device may be triggered to untwine from a primary wireless communication device of a driver when the rental car agency checks-in the rental car when it is returned by the renter. The check-in computer or tablet computer of the check-in worker may communicate wirelessly to the in-vehicle wireless communication device or back to the wireless communication network to cause the untwinning of the in-vehicle wireless communication device from the primary wireless communication device of the last driver. When a new driver checks-out the vehicle, the computer or tablet computer of the check-out clerk can transmit the phone number of the primary wireless communication device of the new driver to the in-vehicle wireless communication device so that it can twin to the primary wireless communication device of the new driver in a process like that described above. Alternatively, the computer or tablet computer of the check-out clerk may build and transmit the bundle of twinning credentials and send them to the wireless communication network to complete the twinning process. In the case of rental car twinning, the phone number of the primary wireless communication device of a car renter may be twinned to the in-vehicle wireless communication device without notifying a billing server of the twinning relationship. In this case, the billing for the wireless communication of the in-vehicle wireless communication device may be statically linked to an account associated with the rental car agency, such that the twinning service is offered free of charge to renter or without additional charges (the twinning service may be built into the cost of renting the car without billing back to the subject car renter's wireless communication subscription account).

In an embodiment, the eSIM profile stored in the eUICC of the in-vehicle wireless communication device is provisioned for service in a plurality of wireless communication service provider networks. Typically, an eSIM profile is provisioned for service to only one wireless communication service provider network, and its EID is uniquely associated with a range of EID values owned by the one service provider. Additionally, the eSIM profile content typically defines wireless communications service provider data associated with a single wireless communication service provider. Here, however, the eSIM profile content defines either generic service provider data suitable for obtaining wireless service in a plurality of different wireless communication service provider networks or defines a plurality of different sets of service provider data, where each set of service provider data is suitable for obtaining wireless service in the associated service provider network.

Turning now to FIG. 1, a system 100 is described. In an embodiment, the system 100 comprises an in-vehicle wireless communication device 102 quasi-permanently installed in a vehicle 101. The in-vehicle device 102 may be part of a telematics unit or a head unit installed in a vehicle. The vehicle 101 may be an automobile, a sports utility vehicle (SUV), a minivan, a van, a pickup truck, a moving truck, a delivery truck, a semi-truck cab, or other vehicle. The in-vehicle wireless communication device 102 comprises a cellular radio transceiver 104 that is able to establish a wireless communication link with a cell site 106 according to a 5G, a long-term evolution (LTE), a code division multiple access (CDMA), or a global system for mobile communication (GSM) telecommunication protocol. The cell site 106 is communicatively coupled to a network 108, thereby communicatively coupling the in-vehicle wireless communication device 102 to the network 108 and to other communication entities such as application servers, content servers, and wireless communication devices that are communicatively coupled to the network 108. The network 108 comprises one or more private networks, one or more public networks, or a combination thereof.

The cellular radio transceiver 104 establishes the wireless communication link with the cell site 106 based at least in part on providing contents of an eSIM profile 116 stored in an eUICC 114 of the in-vehicle wireless communication device 102. The eSIM profile 116 comprises a variety of wireless communication service provider data and wireless communication service subscriber data. The eSIM profile may define network access keys and credentials, encryption keys, preferred roaming lists (PRLs), executable applications, branding content, and other data. In an embodiment, the eSIM profile 116 is loaded into the eUICC 114 at the time the eUICC 114 is manufactured or when the in-vehicle wireless communication device 102 is manufactured, for example by an original equipment manufacturer (OEM). In an embodiment, the eSIM profile 116 is loaded into the eUICC 114 at the time of the assembly or manufacturing of the vehicle 101. In an embodiment, the eSIM profile 116 is loaded into the eUICC 114 by a worker at a dealership that sells the vehicle 101. In an embodiment, the eSIM profile 116 is loaded into the eUICC 114 by an owner of the vehicle 101, for example pursuant to original purchase of the vehicle 101.

The in-vehicle wireless communication device 102 further comprises a processor 110 and a non-transitory memory 112 that stores a twinning application 120. When executed by the processor 110, the twinning application 120 can communicate via the cellular radio transceiver 104, via the cell site 106, and via the network 108 to a server computer 122 executing a twinning server application 124 to twin the in-vehicle wireless communication device 102 with a primary wireless communication device 130. As used herein, the term 'twinning' means to establish an association between the in-vehicle wireless communication device 102 and the primary wireless communication device 130 such that voice calls and data calls sent to the primary wireless communication device 130 based on a phone number of the primary wireless communication device 130 are also sent to the in-vehicle wireless communication device 102.

The primary wireless communication device 130 may be referred to as user equipment (UE) and may be a mobile phone, a smart phone, a personal digital assistant (PDA), a wearable computer, a headset computer, a laptop computer, a tablet computer, or a notebook computer. The primary wireless communication device 130 may receive a cellular wireless communication link from the same cell site 106 that provides a wireless link to the in-vehicle wireless communication device 102 or by a different cell site (e.g., the primary wireless communication device 130 may be left at home or at a workplace while the subscriber is driving in the vehicle 101). The user of the primary wireless communication device 130 may be a subscriber of a wireless communication service provider who has a service account established for the primary wireless communication device 130.

The twinning of the in-vehicle wireless communication device 102 to the primary wireless communication device 130 or to the wireless communication service subscription account of the primary wireless communication device 130 comprises the twinning server application 124 establishing an association between the phone number of the primary wireless communication device 130 and the in-vehicle wireless communication device 102 in the backend of the wireless communication service provider network, for example in a data store 126. The association may take the form of a record or row in the data store 126 that associates the phone number of the primary wireless communication device 130 to the integrated circuit card identity (ICCID) identifying the eUICC 114 and the embedded identity document (EID) identifying the eSIM profile 116 stored in the eUICC 114. In an embodiment, the association may further comprise a vehicle identification number (VIN) of the vehicle 101.

The twinning of the in-vehicle wireless communication device 102 to the primary wireless communication device 130 or to the wireless communication service subscription account of the primary wireless communication device 130 may also comprise sending a message by the twinning server application 124 to a billing server 128 informing it of the association between the in-vehicle wireless communication device 102 and the primary wireless communication device 130. Alternatively, the billing server 128 directly accesses the data store 126 and learns of the association between the in-vehicle wireless communication device 102 and the primary wireless communication device 130 from looking up the association in the data store 126 based on the ICCID or EID that refer back to the eUICC 114 of the in-vehicle wireless communication device 102. In this way the billing server 128 may link call detail records (CDRs) that include data related to the ICCID or EID of the eUICC 114 of the in-vehicle wireless communication device 102 and bill the associated communication activity to the service subscription account of the primary wireless communication device 130. As the twinning of the in-vehicle wireless communication device 102 changes from a first primary wireless communication device to a second primary wireless communication device, the billing for communication services used by the in-vehicle wireless communication device 102 after this change is billed to a service subscription account of the second primary wireless communication device.

In an embodiment, a user of the primary wireless communication device 130 may input data to the twinning application 120 via a user interface of the in-vehicle wireless communication device 102, for example into an in-dash touchscreen. The data may be the phone number (mobile station integrated services digital network: MSISDN) of the primary wireless communication device 130. The data may be the vehicle identification number (VIN) of the vehicle 101. The data may be the ICCID of the eUICC 114 and the EID of the eSIM profile 116. Alternatively, the twinning application 120 may obtain the VIN from the telematics unit or head unit of the vehicle 101 and may obtain the ICCID of the eUICC 114 and the EID of the eSIM profile 116 from the eUICC 114.

The user may then enter a command or select a control of the user interface to send the data via the cellular radio transceiver 104, the cell site 106, the network 108, to the twinning server application 124 executing on the server 122. In an embodiment, the user may associate a Bluetooth identity to the phone number of the primary wireless communication device 130 using the user interface of the in-vehicle wireless communication device 102. In an embodiment, the user may associate a key fob identity or serial number to the phone number of the primary wireless communication device 130 using the user interface of the in-vehicle wireless communication device 102.

In an embodiment, the user may be challenged by the in-vehicle wireless communication device 102 to provide a personal identification number (PIN) to authorize entry of data and for selecting changing the twinning of the in-vehicle wireless communication device 102 to a different primary wireless communication device. In an embodiment, the twinning application 120 may engage the user in a two-factor authentication process, for example challenging the user to enter the PIN, sending a one-time use code to the user's primary wireless communication device 130, and prompting the user to enter the one-time use code into the user interface of the in-vehicle wireless communication device 102. In an embodiment, when twinning of the in-vehicle wireless communication device 102 is changed to a different user's primary wireless communication device 130, notification of the twinning change may be sent to the primary wireless communication device 130 to which the in-vehicle wireless communication device 102 was previously twinned.

Figure 2:
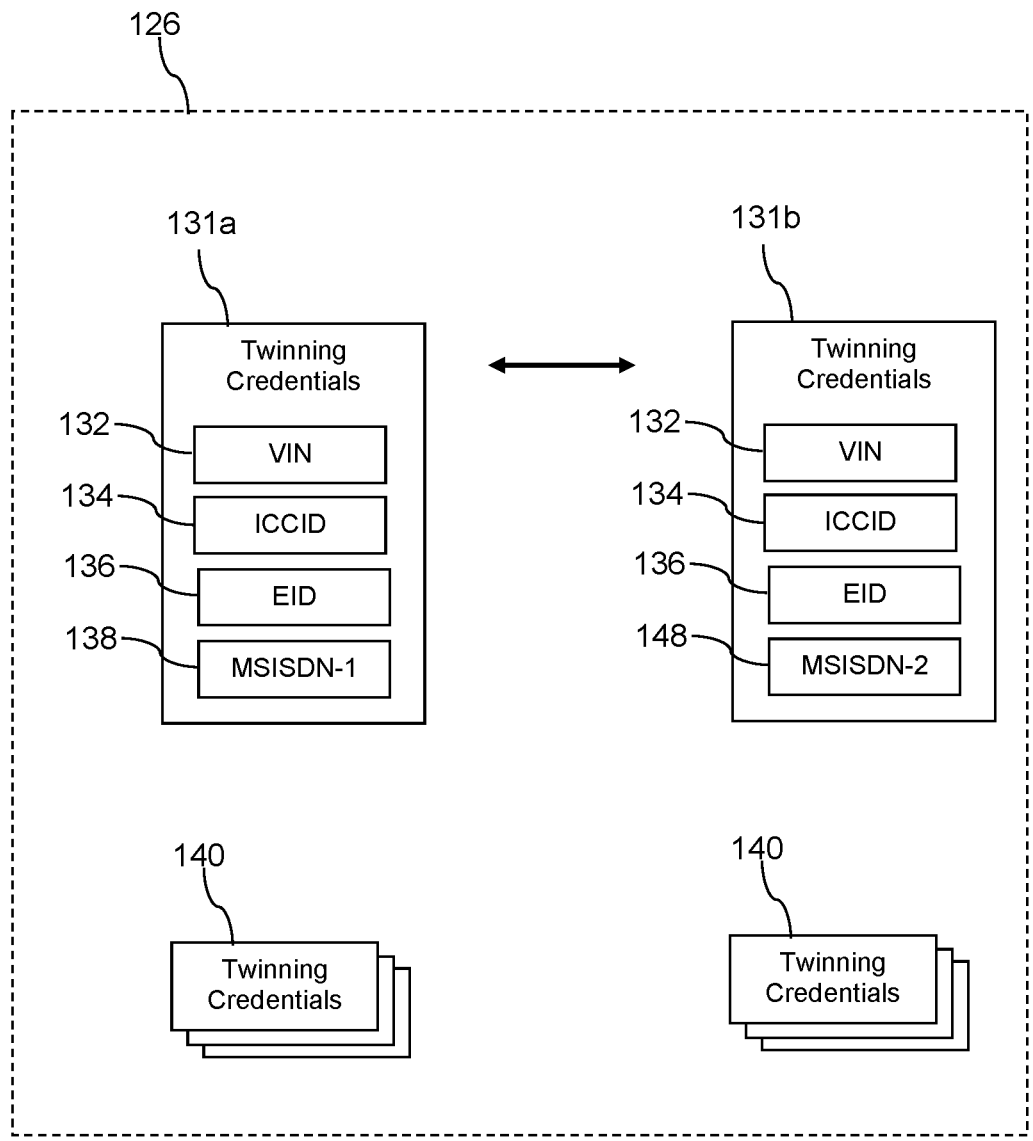
FIG. 2 is an illustration of a portion of a data store according to an embodiment of the disclosure.

Turning now to FIG. 2, twinning credentials 131 associated with the in-vehicle wireless communication device 102 stored in the data store 126 are described. At a first time, a first set of twinning credentials 131a are associated with the in-vehicle wireless communication device. The first set of twinning credentials 131a comprise a VIN 132 assigned to the vehicle, an ICCID 134 that identifies the eUICC 114, an EID 136 that identifies the eSIM profile 116, and a first MSISDN 138 associated with the primary wireless communication device 130. At a later time, the twinning credentials 131 associated with the in-vehicle wireless communication device 102 stored in the data store 126 may be changed to refer to a different primary wireless communication device. For example, the vehicle 101 may be a family vehicle that is shared by two or more different family members. When a first family member drives the vehicle 101, the in-vehicle wireless communication device 102 may be twinned to the primary wireless communication device 130 of that first family member. At a later time, when a different family member drives the vehicle 101, the in-vehicle wireless communication device 102 may be twinned to the primary wireless communication device of that different family member. For example, the second set of twinning credentials 131b at this different time may store the same VIN 132, the same ICCID 134, and the same EID 136 as the first twinning credentials 131a, but the second set of twinning credentials 131b store a second MSIDSN 148 associated with the primary mobile communication device of this different family member. It is understood that the twinning of in-vehicle wireless communication devices does not stop at just a single example of the device 102 described with reference to FIG. 1. The system 100 is understood to apply to thousands and possibly millions of in-vehicle wireless communication devices 102 that may twin via twinning credentials 140 stored in the data store 126 to other primary wireless communication devices.

The twinning credentials 131 may migrate back and forth over time among different family members. At a first time, the first MSISDN 138 is associated with the VIN 132, ICCID 134, and EID 136 in the data store 126. At a second later time, the second MSISDN 148 is associated with the VIN 132, ICCID 134, and EID 136 in the data store 126. At a third time, later than the second time, the first MSISDN 148 is again associated with the VIN 132, ICCID 134, and EID 136 in the data store 126. Also, at another time, a third MSISDN may be associated with the VIN 132, ICCID 134, and EID 136 in the data store 126. In an embodiment, rather than storing MSISDNs, the twinning credentials 132, 140 may store international mobile subscriber identities (IMSIs) associated with the primary wireless communication devices.

The migration of twinning credentials 131 may be triggered by a user interacting with a user interface of the in-vehicle wireless communication device 102 or a web page. Once the user has entered in his or her MSISDN of his or her primary wireless communication device 130, the interface may retain this information and allow him or her to select this stored information with a button click or a screen touch rather than repeatedly entering the same information over and over again. In an embodiment, the twinning application 120 may allow a user to configure a schedule for automatically migrating the twinning credentials 131 back and forth, for example in accordance with work schedules of family members. The twinning application 120 executing on the processor 110 may determine that a scheduled migration is due and complete the process of migrating twinning credentials 131 appropriately.

In an embodiment, the in-vehicle wireless communication device comprises a Bluetooth radio transceiver 132 and may detect a Bluetooth radio emission of the primary wireless communication device 130. In this case, the twinning application 120 may automatically migrate the twinning 130 to associate the in-vehicle wireless communication device 102 to the primary wireless communication device 130 whose Bluetooth radio transmission the twinning application 120 has detected. In some contexts, this may be referred to as the migration of twinning credentials 131 being triggered by detection of a Bluetooth identity of the primary wireless communication device 130. When two or different Bluetooth radio transmissions are detected by the twinning application 120, the twinning application 120 may disable Bluetooth identity triggered twinning migration. In this case users may employ a user interface to control migration of twinning if desired. In an embodiment, in-vehicle wireless communication device may detect key fobs and use such detections to trigger migration of the twinning 130 to associate the in-vehicle wireless communication device 102 to the primary wireless communication device 130 that is associated with the detected key fob.

While the migration of twinning credentials 131 has been described above with reference to the use case of family members sharing the vehicle 101, the same migration of twinning credentials 131 may be advantageously applied to the use case of twinning an in-vehicle wireless communication device 102 in a rental car to different primary wireless communication devices 130 of different renters of the same rental car. The migration of the twinning credentials 131 to include the MSISDN of a new renter may be triggered by a computer system checking the vehicle 101 out to a driver, for example at the counter of a rental car agency. The migration of the twinning credentials 131 may also be triggered by a check-in handheld device on the event of a driver checking a rental car (e.g., the vehicle 101) back into the rental agency. In the rental care use case, the twinning credentials 131 may be migrated to contain a null or invalid value in the MSISDN portion of the twinning credentials 131, since, at least for an interim period of time, the in-vehicle wireless communication device 102 may be twinned to no primary mobile communication device 130 at times between rentals. Such in-between times may extend for hours or for days.

Figure 3:
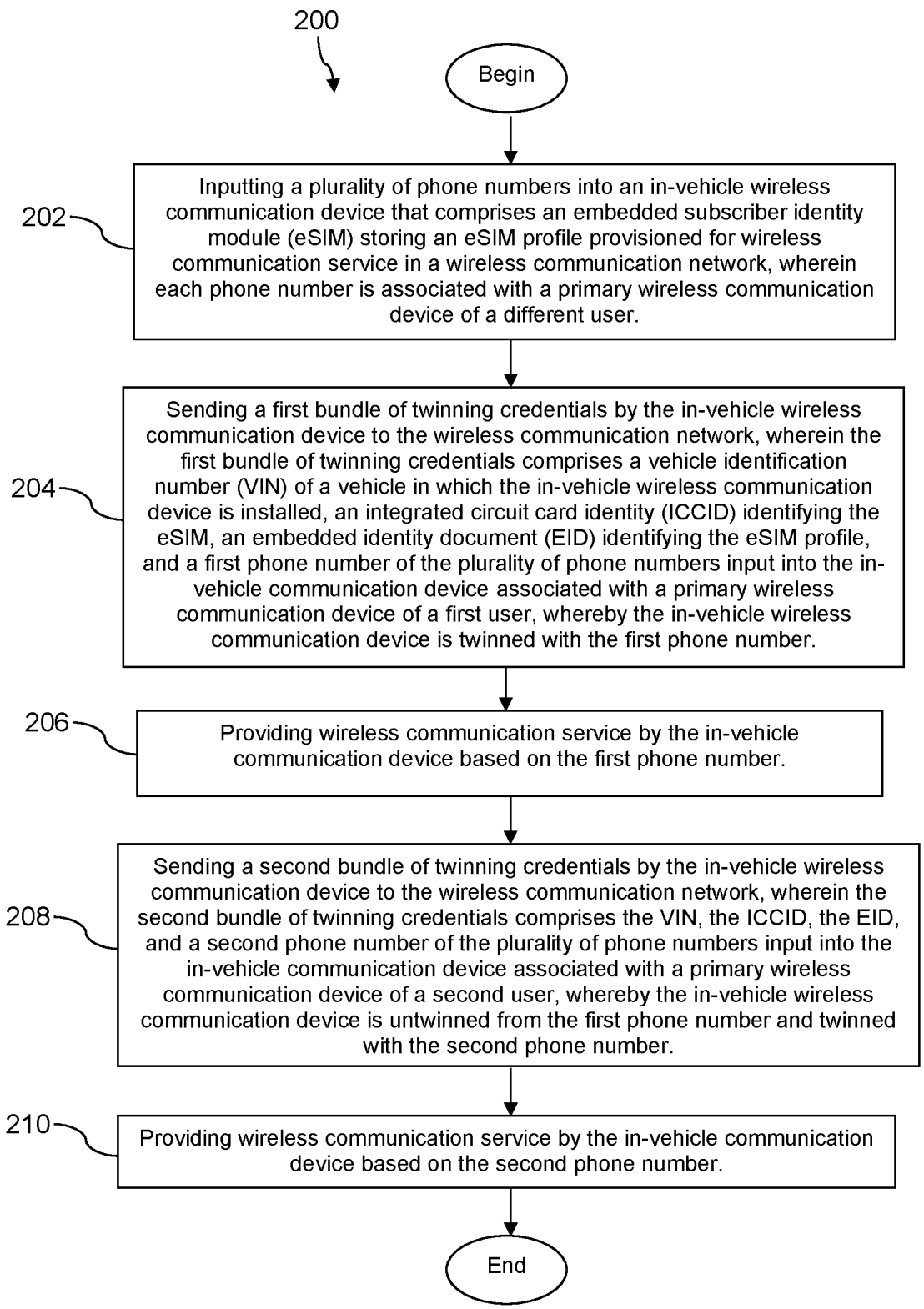
FIG. 3 is a flow chart of a method according to an embodiment of the disclosure.

Turning now to FIG. 3, a method 200 is described. In an embodiment, the method 200 is a method of twinning a primary wireless communication device with an in-vehicle wireless communication device. At block 202, the method 200 comprises inputting a plurality of phone numbers into an in-vehicle wireless communication device that comprises an embedded subscriber identity module (eSIM) storing an eSIM profile provisioned for wireless communication service in a wireless communication network, wherein each phone number is associated with a primary wireless communication device of a different user. In an embodiment, the eSIM profile is provisioned to receive a wireless link provided by a cell site according to at least one of a 5G, a long-term evolution (LTE), a code division multiple access (CDMA), or a global system for mobile communication (GSM) telecommunication protocol. In an embodiment, the in-vehicle wireless communication device is part of a telematics unit or a head unit.

At block 204, the method 200 comprises sending a first bundle of twinning credentials by the in-vehicle wireless communication device to the wireless communication network, wherein the first bundle of twinning credentials comprises a vehicle identification number (VIN) of a vehicle in which the in-vehicle wireless communication device is installed, an integrated circuit card identity (ICCID) identifying the eSIM, an embedded identity document (EID) identifying the eSIM profile, and a first phone number of the plurality of phone numbers input into the in-vehicle communication device associated with a primary wireless communication device of a first user, whereby the in-vehicle wireless communication device is twinned with the first phone number. In an embodiment, the vehicle in which the in-vehicle wireless communication device is installed is selected from the list consisting of an automobile, a sports utility vehicle (SUV), a minivan, a van, a pickup truck, a moving truck, a delivery truck, and a semi-truck cab. In an embodiment, the method 200 further comprises receiving by the in-vehicle wireless communication device a first Bluetooth radio signal emitted by the primary wireless communication device of the first user (e.g., before the processing of block 204), wherein sending the first bundle of twinning credentials by the in-vehicle wireless communication device to the wireless communication network is triggered by detecting the first Bluetooth radio signal;

At block 206, the method 200 comprises providing wireless communication service by the in-vehicle communication device based on the first phone number. In an embodiment, providing wireless communication service by the in-vehicle communication device based on the first phone number comprises receiving a voice phone call directed to the first phone number. In an embodiment, providing wireless communication service by the in-vehicle communication device based on the first phone number comprises originating a voice call. In an embodiment, providing wireless communication service by the in-vehicle communication device based on the first phone number is further based on the ICCID identifying the eSIM and the EID identifying the eSIM profile.

At block 208, the method 200 comprises sending a second bundle of twinning credentials by the in-vehicle wireless communication device to the wireless communication network, wherein the second bundle of twinning credentials comprises the VIN, the ICCID, the EID, and a second phone number of the plurality of phone numbers input into the in-vehicle communication device associated with a primary wireless communication device of a second user, whereby the in-vehicle wireless communication device is untwinned from the first phone number and twinned with the second phone number. In an embodiment, method 200 further comprises receiving by the in-vehicle wireless communication device a second Bluetooth radio signal emitted by the primary wireless communication device of the second user (e.g., before the processing of block 208), wherein sending the second bundle of twinning credentials by the in-vehicle wireless communication device to the wireless communication network is triggered by detecting the second Bluetooth radio signal.

At block 210, the method 200 comprises providing wireless communication service by the in-vehicle communication device based on the second phone number. In an embodiment, providing wireless communication service by the in-vehicle communication device based on the second phone number is further based on the ICCID identifying the eSIM and the EID identifying the eSIM profile.

Figure 4A:
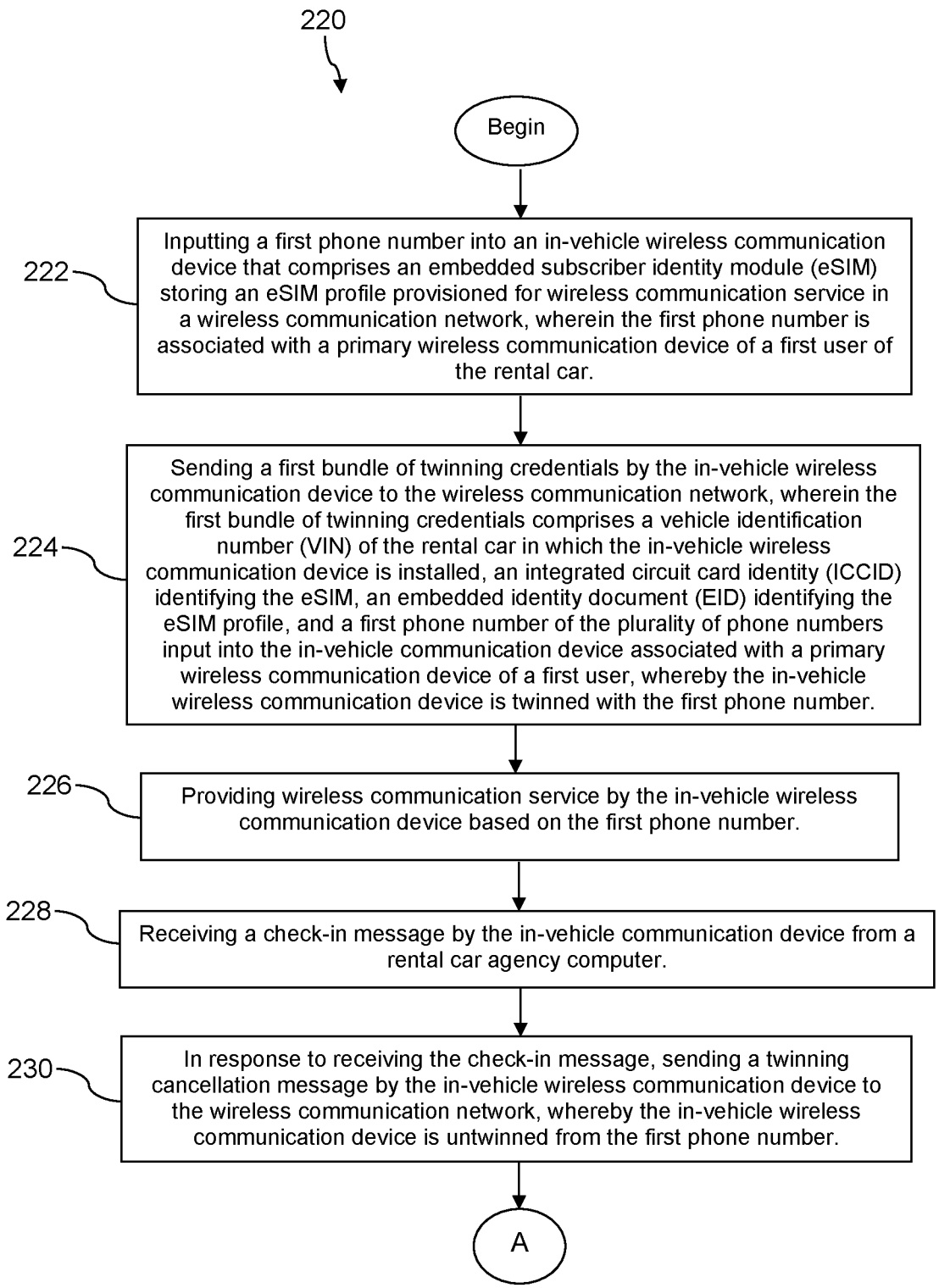
FIG. 4A and FIG. 4B are a flow chart of another method according to an embodiment of the disclosure.
Figure 4B:
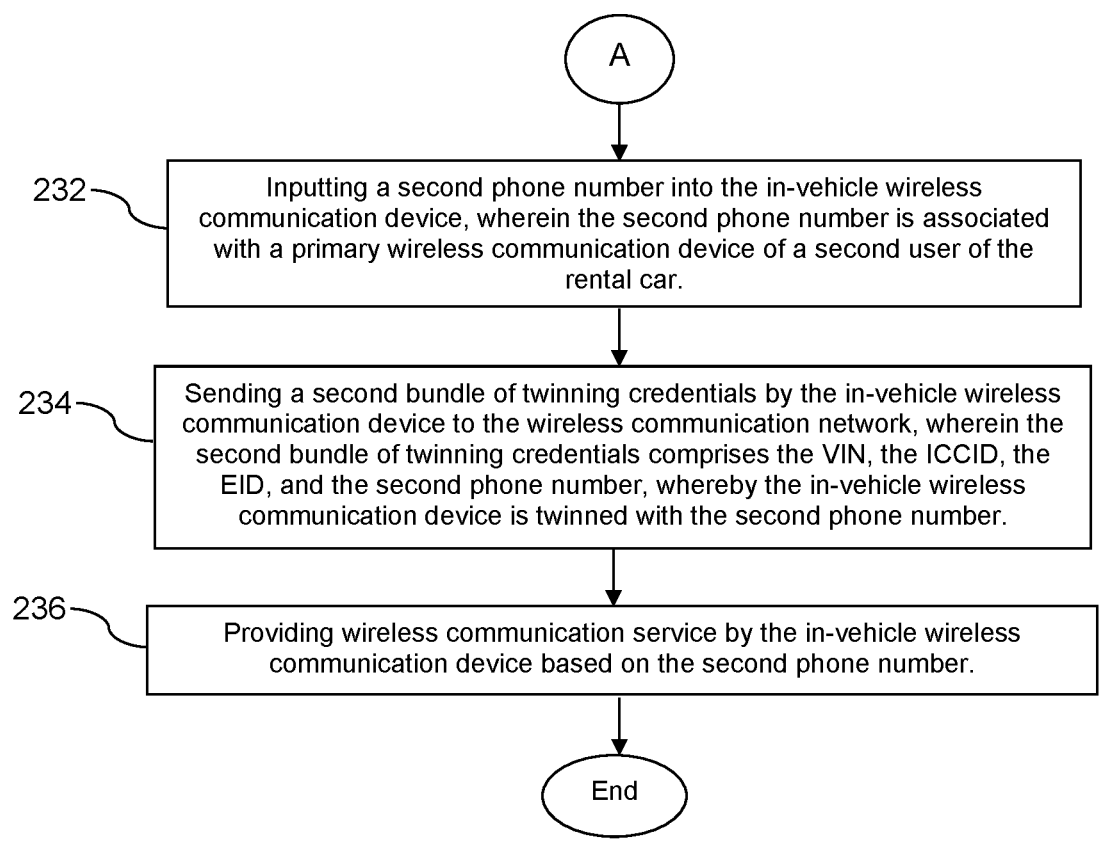

Turning now to FIG. 4A and FIG. 4B, a method 220 is described. In an embodiment, the method 220 is a method of twinning a primary wireless communication device with an in-vehicle wireless communication device of a rental car. At block 222, the method 220 comprises inputting a first phone number into an in-vehicle wireless communication device that comprises an embedded subscriber identity module (eSIM) storing an eSIM profile provisioned for wireless communication service in a wireless communication network, wherein the first phone number is associated with a primary wireless communication device of a first user of the rental car. In an embodiment, the eSIM profile is provisioned to receive a wireless link provided by a cell site according to at least one of a 5G, a long-term evolution (LTE), a code division multiple access (CDMA), or a global system for mobile communication (GSM) telecommunication protocol. In an embodiment, the in-vehicle wireless communication device is part of a telematics unit or a head unit. In an embodiment, a vehicle in which the in-vehicle wireless communication device is installed is selected from the list consisting of an automobile, a sports utility vehicle (SUV), a minivan, a van, a pickup truck, and a moving truck.

At block 224, the method 220 comprises sending a first bundle of twinning credentials by the in-vehicle wireless communication device to the wireless communication network, wherein the first bundle of twinning credentials comprises a vehicle identification number (VIN) of the rental car in which the in-vehicle wireless communication device is installed, an integrated circuit card identity (ICCID) identifying the eSIM, an embedded identity document (EID) identifying the eSIM profile, and a first phone number of the plurality of phone numbers input into the in-vehicle communication device associated with a primary wireless communication device of a first user, whereby the in-vehicle wireless communication device is twinned with the first phone number. At block 226, the method 220 comprises providing wireless communication service by the in-vehicle communication device based on the first phone number. In an embodiment, providing wireless communication service by the in-vehicle communication device based on the first phone number comprises originating a data communication session. In an embodiment, providing wireless communication service by the in-vehicle communication device based on the first phone number is further based on the ICCID identifying the eSIM and the EID identifying the eSIM profile and wherein providing wireless communication service by the in-vehicle communication device based on the second phone number is further based on the ICCID identifying the eSIM and the EID identifying the eSIM profile.

At block 228, the method 220 comprises receiving a check-in message by the in-vehicle communication device from a rental car agency computer. At block 230, the method 220 comprises in response to receiving the check-in message, sending a twinning cancellation message by the in-vehicle wireless communication device to the wireless communication network, whereby the in-vehicle wireless communication device is untwinned from the first phone number. At block 232, the method comprises inputting a second phone number into the in-vehicle wireless communication device, wherein the second phone number is associated with a primary wireless communication device of a second user of the rental car A block 234, the method 220 comprises sending a second bundle of twinning credentials by the in-vehicle wireless communication device to the wireless communication network, wherein the second bundle of twinning credentials comprises the VIN, the ICCID, the EID, and the second phone number, whereby the in-vehicle wireless communication device is twinned with the second phone number. At block 236, the method 220 comprises providing wireless communication service by the in-vehicle communication device based on the second phone number.

Figure 5A:
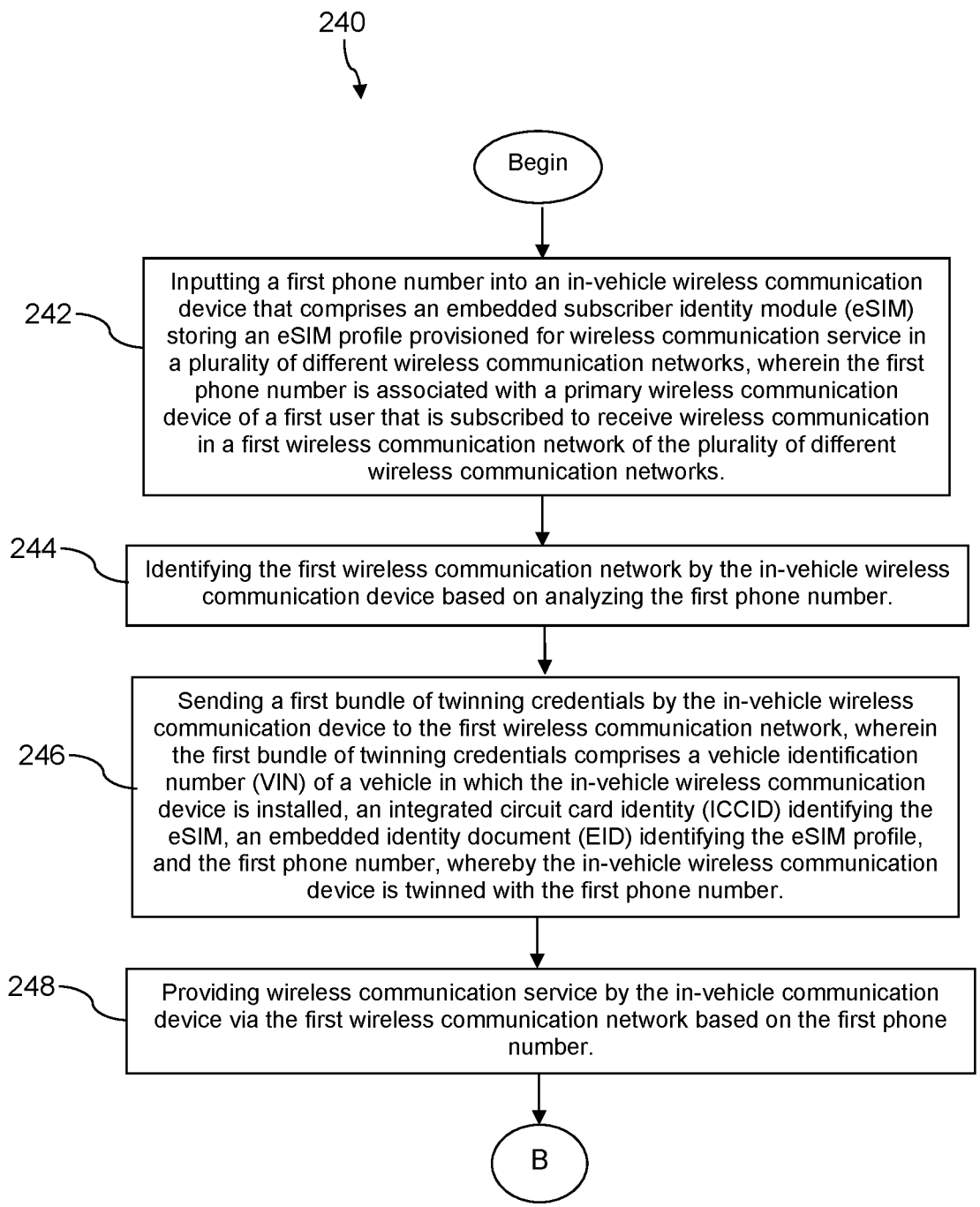
FIG. 5A and FIG. 5B are a flow chart of yet another method according to an embodiment of the disclosure.
Figure 5B:
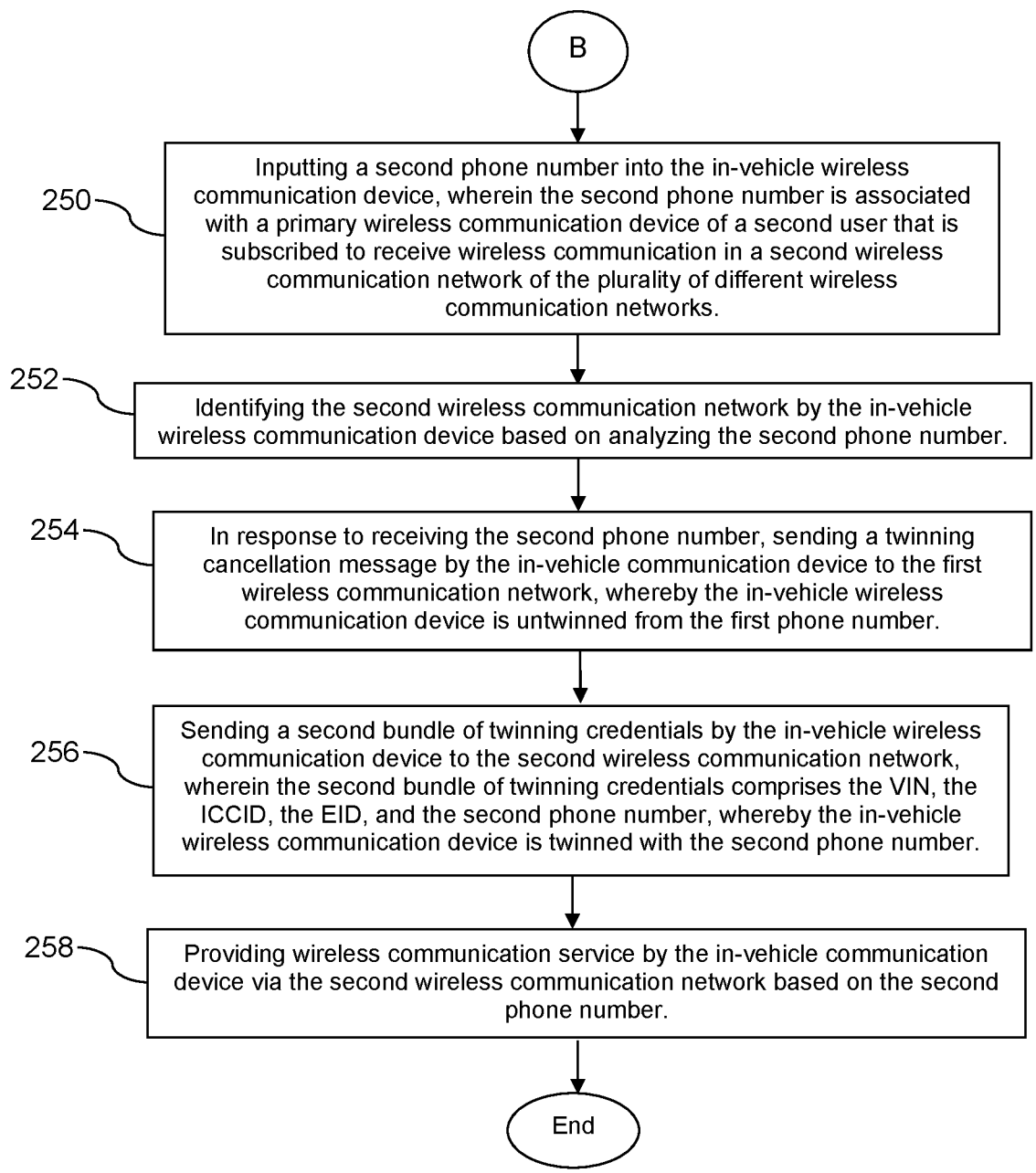

Turning now to FIG. 5A and FIG. 5B, a method 240 is described. In an embodiment, the method 240 is a method of twinning a primary wireless communication device with an in-vehicle wireless communication device. At block 242, the method 240 comprises inputting a first phone number into an in-vehicle wireless communication device that comprises an embedded subscriber identity module (eSIM) storing an eSIM profile provisioned for wireless communication service in a plurality of different wireless communication networks, wherein the first phone number is associated with a primary wireless communication device of a first user that is subscribed to receive wireless communication in a first wireless communication network of the plurality of different wireless communication networks. In an embodiment, the eSIM profile is provisioned to receive a wireless link provided by a cell site according to at least one of a 5G, a long-term evolution (LTE), a code division multiple access (CDMA). In an embodiment, the in-vehicle wireless communication device is part of a telematics unit or a head unit, or a global system for mobile communication (GSM) telecommunication protocol.

At block 244, the method 240 comprises identifying the first wireless communication network by the in-vehicle wireless communication device based on analyzing the first phone number. At block 246, the method 240 comprises sending a first bundle of twinning credentials by the in-vehicle wireless communication device to the first wireless communication network, wherein the first bundle of twinning credentials comprises a vehicle identification number (VIN) of a vehicle in which the in-vehicle wireless communication device is installed, an integrated circuit card identity (ICCID) identifying the eSIM, an embedded identity document (EID) identifying the eSIM profile, and the first phone number, whereby the in-vehicle wireless communication device is twinned with the first phone number. In embodiment, the method 240 further comprises receiving by the in-vehicle wireless communication device a first Bluetooth radio signal emitted by the primary wireless communication device of the first user (e.g., before the processing of block 246), wherein sending the first bundle of twinning credentials by the in-vehicle wireless communication device to the first wireless communication network is triggered by detecting the first Bluetooth radio signal. In an embodiment, the vehicle in which the in-vehicle wireless communication device is installed is selected from the list consisting of an automobile, a sports utility vehicle (SUV), a minivan, a van, a pickup truck, a moving truck, a delivery truck, and a semi-truck cab.

At block 248, the method 240 comprises providing wireless communication service by the in-vehicle communication device via the first wireless communication network based on the first phone number. In an embodiment, providing wireless communication service by the in-vehicle communication device based on the first phone number is further based on the ICCID identifying the eSIM profile and the EID identifying the eSIM.

At block 250, the method 240 comprises inputting a second phone number into the in-vehicle wireless communication device, wherein the second phone number is associated with a primary wireless communication device of a second user that is subscribed to receive wireless communication in a second wireless communication network of the plurality of different wireless communication networks. At block 252, the method 240 comprises identifying the second wireless communication network by the in-vehicle wireless communication device based on analyzing the second phone number. At block 254, the method 240 comprises, in response to receiving the second phone number, sending a twinning cancellation message by the in-vehicle communication device to the first wireless communication network, whereby the in-vehicle wireless communication device is untwined from the first phone number.

At block 256, the method 240 comprises sending a second bundle of twinning credentials by the in-vehicle wireless communication device to the second wireless communication network, wherein the second bundle of twinning credentials comprises the VIN, the ICCID, the EID, and the second phone number, whereby the in-vehicle wireless communication device is twinned with the second phone number. In an embodiment, the method 240 further comprises receiving by the in-vehicle wireless communication device a second Bluetooth radio signal emitted by the primary wireless communication device of the second user (e.g., before the processing of block 256), wherein sending the second bundle of twinning credentials by the in-vehicle wireless communication device to the second wireless communication network is triggered by detecting the second Bluetooth radio signal.

At block 258, the method 240 comprises providing wireless communication service by the in-vehicle communication device via the second wireless communication network based on the second phone number. In an embodiment, providing wireless communication service by the in-vehicle communication device based on the second phone number is further based on the ICCID identifying the eSIM profile and the EID identifying the eSIM.

Figure 6A:
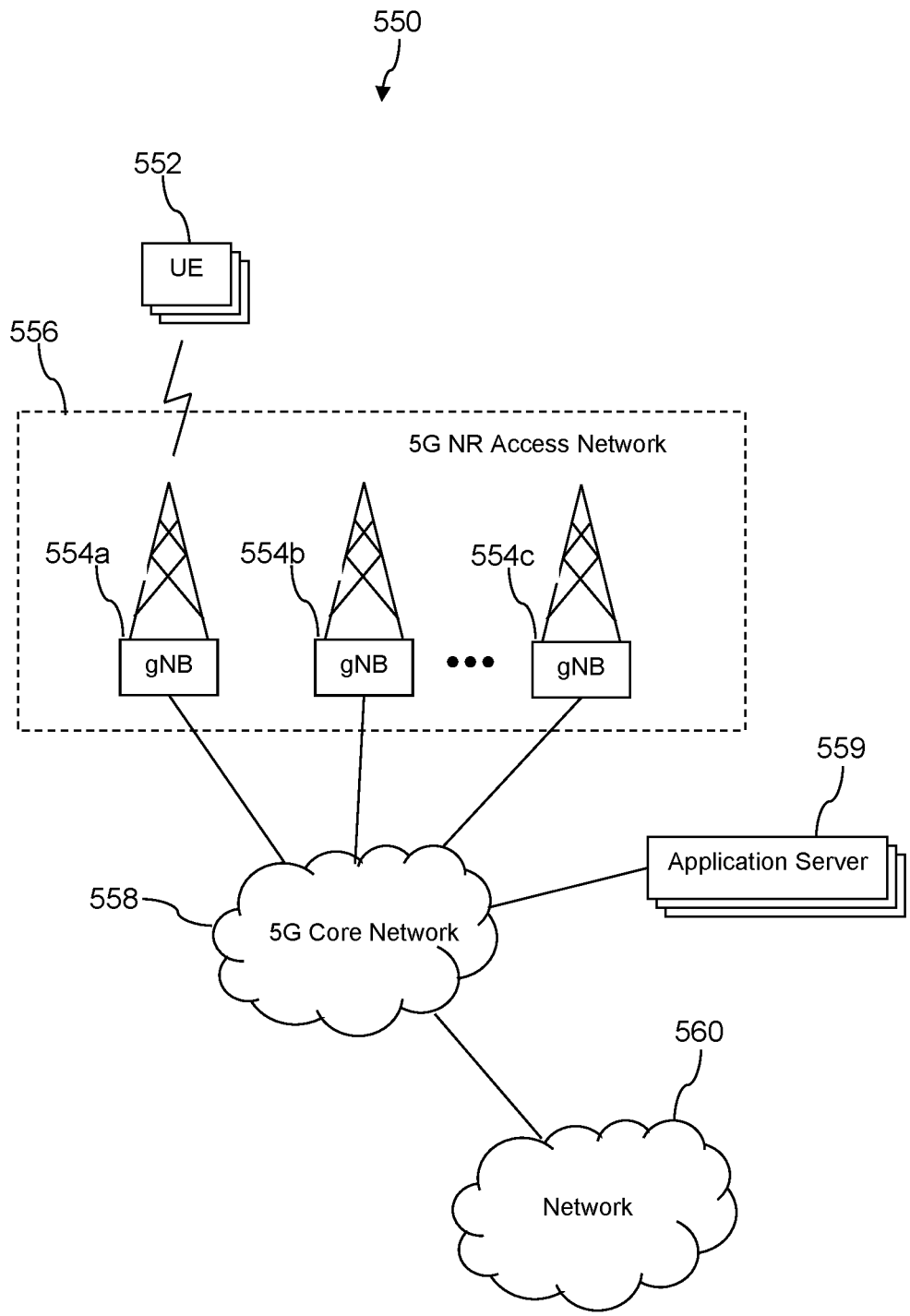
FIG. 6A and FIG. 6B are a block diagram of a communication network architecture according to an embodiment of the disclosure.

Turning now to FIG. 6A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
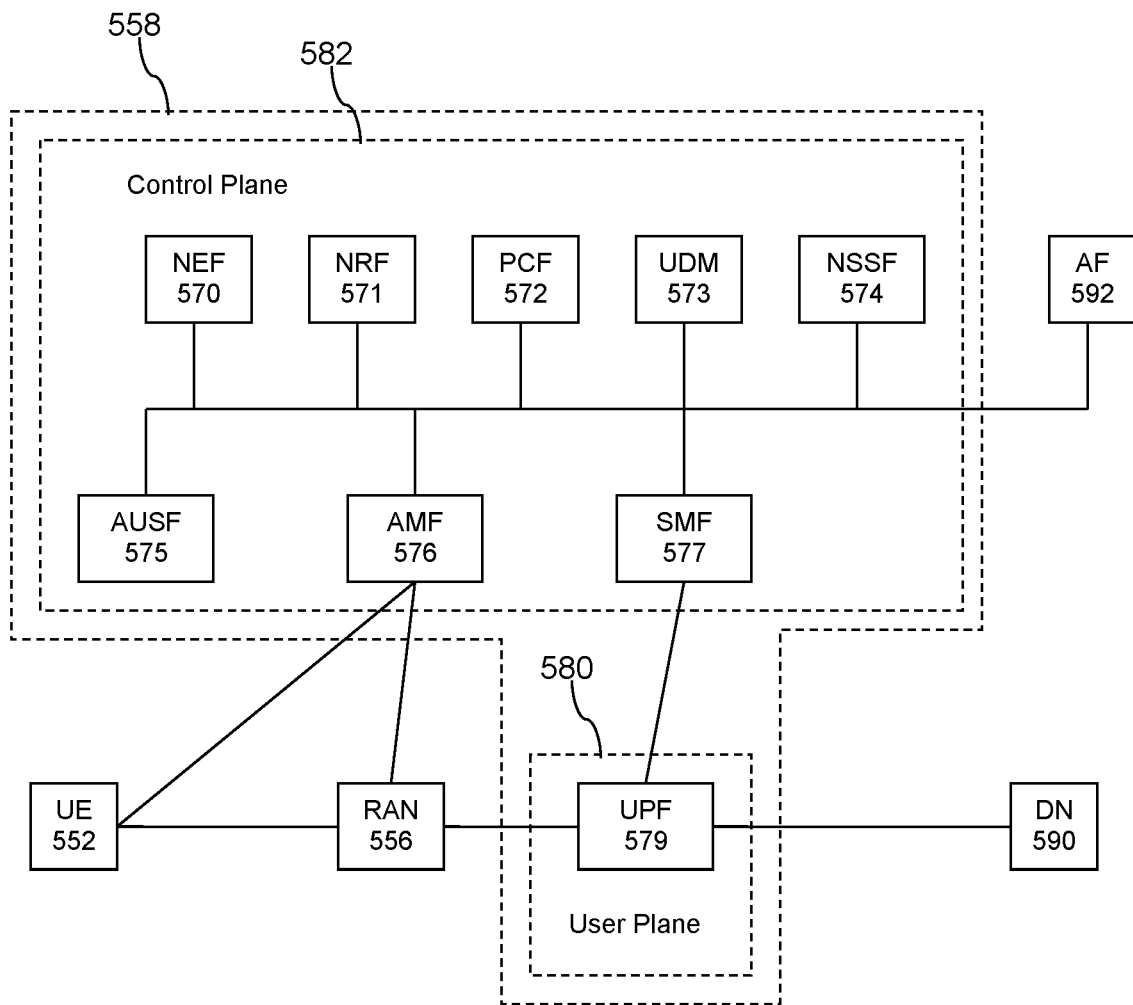

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
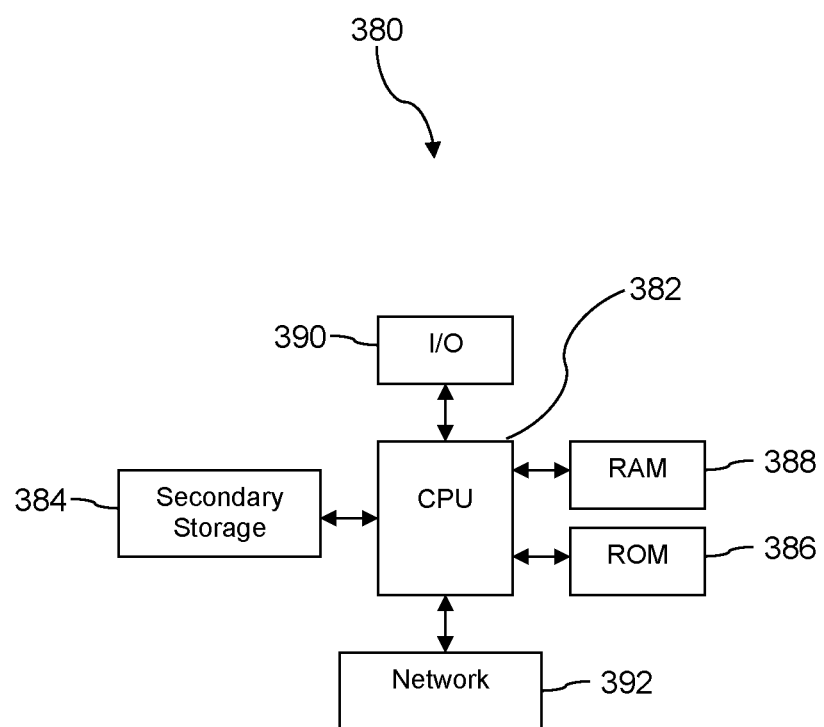
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of twinning a primary wireless communication device with an in-vehicle wireless communication device, comprising:
  inputting a first phone number into the in-vehicle wireless communication device that comprises an embedded subscriber identity module (eSIM) storing an eSIM profile provisioned for wireless communication service in a plurality of different wireless communication networks, wherein the first phone number is associated with a primary wireless communication device of a first user that is subscribed to receive wireless communication in a first wireless communication network of the plurality of different wireless communication networks;
  identifying the first wireless communication network by the in-vehicle wireless communication device based on analyzing the first phone number;
  sending a first bundle of twinning credentials by the in-vehicle wireless communication device to the first wireless communication network, wherein the first bundle of twinning credentials comprises a vehicle identification number (VIN) of a vehicle in which the in-vehicle wireless communication device is installed, an integrated circuit card identity (ICCID) identifying the eSIM, an embedded identity document (EID) identifying the eSIM profile, and the first phone number, whereby the in-vehicle wireless communication device is twinned with the first phone number;

providing wireless communication service by the in-vehicle wireless communication device via the first wireless communication network based on the first phone number;

inputting a second phone number into the in-vehicle wireless communication device, wherein the second phone number is associated with a primary wireless communication device of a second user that is subscribed to receive wireless communication in a second wireless communication network of the plurality of different wireless communication networks;

identifying the second wireless communication network by the in-vehicle wireless communication device based on analyzing the second phone number;

in response to receiving the second phone number, sending a twinning cancellation message by the in-vehicle wireless communication device to the first wireless communication network to cause the in-vehicle wireless communication device to be untwinned from the first phone number, wherein untwinning the in-vehicle wireless communication device from the first phone number disassociates the eSIM of the in-vehicle wireless communication device from the first wireless communication network;

sending a second bundle of twinning credentials by the in-vehicle wireless communication device to the second wireless communication network, wherein the second bundle of twinning credentials comprises the VIN, the ICCID, the EID, and the second phone number, whereby the in-vehicle wireless communication device is twinned with the second phone number; and providing wireless communication service by the in-vehicle wireless communication device via the second wireless communication network based on the second phone number.

2. The method of claim 1, further comprising:
receiving by the in-vehicle wireless communication device a first Bluetooth radio signal emitted by the primary wireless communication device of the first user, wherein sending the first bundle of twinning credentials by the in-vehicle wireless communication device to the first wireless communication network is triggered by detecting the first Bluetooth radio signal; and receiving by the in-vehicle wireless communication device a second Bluetooth radio signal emitted by the primary wireless communication device of the second user, wherein sending the second bundle of twinning credentials by the in-vehicle wireless communication device to the second wireless communication network is triggered by detecting the second Bluetooth radio signal.

3. The method of claim 1, wherein providing wireless communication service by the in-vehicle wireless communication device based on the first phone number is further based on the ICCID identifying the eSIM and the EID identifying the eSIM profile and wherein providing wireless communication service by the in-vehicle wireless communication device based on the second phone number is further based on the ICCID identifying the eSIM and the EID identifying the eSIM profile.

4. The method of claim 1, wherein the vehicle in which the in-vehicle wireless communication device is installed is selected from the list consisting of an automobile, a sports utility vehicle (SUV), a minivan, a van, a pickup truck, a moving truck, a delivery truck, and a semi-truck cab.

5. The method of claim 1, wherein the eSIM profile is provisioned to receive a wireless link provided by a cell site according to at least one of a 5G, a long-term evolution (LTE), a code division multiple access (CDMA), or a global system for mobile communication (GSM) telecommunication protocol.

6. The method of claim 1, wherein the in-vehicle wireless communication device is part of a telematics unit or a head unit.

7. A method of twinning a primary wireless communication device with an in-vehicle wireless communication device of a rental car, comprising:

inputting a first phone number into the in-vehicle wireless communication device that comprises an embedded subscriber identity module (eSIM) storing an eSIM profile provisioned for wireless communication service in a wireless communication network, wherein the first phone number is associated with a primary wireless communication device of a first user of the rental car;

sending a first bundle of twinning credentials by the in-vehicle wireless communication device to the wireless communication network, wherein the first bundle of twinning credentials comprises a vehicle identification number (VIN) of the rental car in which the in-vehicle wireless communication device is installed, an integrated circuit card identity (ICCID) identifying the eSIM, an embedded identity document (EID) identifying the eSIM profile, and a first phone number of the plurality of phone numbers input into the in-vehicle wireless communication device associated with a primary wireless communication device of a first user, whereby the in-vehicle wireless communication device is twinned with the first phone number;

providing wireless communication service by the in-vehicle wireless communication device based on the first phone number;

receiving a check-in message by the in-vehicle wireless communication device from a rental car agency computer;

in response to receiving the check-in message, sending a twinning cancellation message by the in-vehicle wireless communication device to the wireless communication network to cause the in-vehicle wireless communication device to be untwinned from the first phone number, wherein untwinning the in-vehicle wireless communication device from the first phone number disassociates the eSIM of the in-vehicle wireless communication device from the first phone number at a server of a provider of the wireless communication service;

inputting a second phone number into the in-vehicle wireless communication device, wherein the second phone number is associated with a primary wireless communication device of a second user of the rental car;

sending a second bundle of twinning credentials by the in-vehicle wireless communication device to the wireless communication network, wherein the second bundle of twinning credentials comprises the VIN, the ICCID, the EID, and the second phone number to cause the in-vehicle wireless communication device to be twinned with the second phone number, wherein twinning the in-vehicle wireless communication device with the second phone number associates the eSIM of the in-vehicle wireless communication device with the second phone number at the server of the provider of the wireless communication service; and providing wireless communication service by the in-vehicle wireless communication device based on the second phone number.

8. The method of claim 7, wherein the eSIM profile is provisioned to receive a wireless link provided by a cell site according to at least one of a 5G, a long-term evolution (LTE), a code division multiple access (CDMA), or a global system for mobile communication (GSM) telecommunication protocol.

9. The method of claim 7, wherein the in-vehicle wireless communication device is part of a telematics unit or a head unit.

10. The method of claim 7 wherein the vehicle in which the in-vehicle wireless communication device is installed is selected from the list consisting of an automobile, a sports utility vehicle (SUV), a minivan, a van, a pickup truck, and a moving truck.

11. The method of claim 7, wherein providing wireless communication service by the in-vehicle wireless communication device based on the first phone number comprises originating a data communication session.

12. The method of claim 7, wherein providing wireless communication service by the in-vehicle wireless communication device based on the first phone number is further based on the ICCID identifying the eSIM and the EID identifying the eSIM profile and wherein providing wireless communication service by the in-vehicle wireless communication device based on the second phone number is further based on the ICCID identifying the eSIM and the EID identifying the eSIM profile.

13. A method of twinning a primary wireless communication device with an in-vehicle wireless communication device, comprising:
  inputting a plurality of phone numbers into the in-vehicle wireless communication device that comprises an embedded subscriber identity module (eSIM) storing an eSIM profile provisioned for wireless communication service in a wireless communication network, wherein each phone number is associated with a primary wireless communication device of a different user;
  sending a first bundle of twinning credentials by the in-vehicle wireless communication device to the wireless communication network, wherein the first bundle of twinning credentials comprises a vehicle identification number (VIN) of a vehicle in which the in-vehicle wireless communication device is installed, an integrated circuit card identity (ICCID) identifying the eSIM, an embedded identity document (EID) identifying the eSIM profile, and a first phone number of the plurality of phone numbers input into the in-vehicle wireless communication device associated with a primary wireless communication device of a first user, whereby the in-vehicle wireless communication device is twinned with the first phone number;
  providing wireless communication service by the in-vehicle wireless communication device based on the first phone number;
  sending a second bundle of twinning credentials by the in-vehicle wireless communication device to the wireless communication network, wherein the second bundle of twinning credentials comprises the VIN, the ICCID, the EID, and a second phone number of the plurality of phone numbers input into the in-vehicle wireless communication device associated with a primary wireless communication device of a second user, wherein to send the second bundle of twinning credentials the in-vehicle wireless communication device is untwinned by disassociating the eSIM from the first phone number at a server of a provider of the wireless communication service and twinned with the second phone number by associating the eSIM with the second phone number at the server of the provider of the wireless communication service; and
  providing wireless communication service by the in-vehicle wireless communication device based on the second phone number.

14. The method of claim 13, wherein the eSIM profile is provisioned to receive a wireless link provided by a cell site according to at least one of a 5G, a long-term evolution (LTE), a code division multiple access (CDMA), or a global system for mobile communication (GSM) telecommunication protocol.

15. The method of claim 13, wherein the in-vehicle wireless communication device is part of a telematics unit or a head unit.

16. The method of claim 13, wherein the vehicle in which the in-vehicle wireless communication device is installed is selected from the list consisting of an automobile, a sports utility vehicle (SUV), a minivan, a van, a pickup truck, a moving truck, a delivery truck, and a semi-truck cab.

17. The method of claim 13, wherein providing wireless communication service by the in-vehicle wireless communication device based on the first phone number comprises receiving a voice phone call directed to the first phone number.

18. The method of claim 13, wherein providing wireless communication service by the in-vehicle wireless communication device based on the first phone number comprises originating a voice call.

19. The method of claim 13, wherein providing wireless communication service by the in-vehicle wireless communication device based on the first phone number is further based on the ICCID identifying the eSIM and the EID identifying the eSIM profile and wherein providing wireless communication service by the in-vehicle wireless communication device based on the second phone number is further based on the ICCID identifying the eSIM and the EID identifying the eSIM profile.

20. The method of claim 13, further comprising:
  receiving by the in-vehicle wireless communication device a first Bluetooth radio signal emitted by the primary wireless communication device of the first user, wherein sending the first bundle of twinning credentials by the in-vehicle wireless communication device to the wireless communication network is triggered by detecting the first Bluetooth radio signal; and
  receiving by the in-vehicle wireless communication device a second Bluetooth radio signal emitted by the primary wireless communication device of the second user, wherein sending the second bundle of twinning credentials by the in-vehicle wireless communication device to the wireless communication network is triggered by detecting the second Bluetooth radio signal.

* * * * *